United States Patent [19]

Murray

[11] Patent Number: 5,398,023
[45] Date of Patent: Mar. 14, 1995

[54] SELECTIVE CALL RECEIVER WITH FLIP-OUT DISPLAY

[75] Inventor: Bradley A. Murray, Lantana, Fla.

[73] Assignee: Motorola, Inc., Schaumburg, Ill.

[21] Appl. No.: 92,926

[22] Filed: Jul. 19, 1993

Related U.S. Application Data

[63] Continuation of Ser. No. 583,622, Aug. 27, 1990, abandoned.

[51] Int. Cl.[6] .................. H04B 1/08; H04Q 1/02
[52] U.S. Cl. ................. 340/825.44; 455/348; 455/344; 224/197
[58] Field of Search ........ 340/825.44, 825.19, 340/311.1, 727, 815.27; 341/21; 455/347, 348, 90; 343/702; 224/197; 40/1.5, 1.6; 24/32; 361/681, 393, 394; 364/708.1; 248/921, 923, 919; 312/223.2, 327, 201; 200/50 A

[56] References Cited

U.S. PATENT DOCUMENTS

| | | | |
|---|---|---|---|
| 3,622,720 | 11/1971 | Allen | 200/50 A |
| 4,534,063 | 8/1985 | Krumin et al. | 455/348 |
| 4,596,923 | 6/1986 | Kuo | 312/201 |
| 4,802,241 | 1/1989 | Vickers et al. | 224/197 |
| 4,803,487 | 2/1989 | Willard et al. | 340/825.44 |
| 4,817,194 | 3/1989 | Andros, Jr. | 455/154 |
| 4,856,088 | 8/1989 | Oliwa et al. | 340/311.1 |
| 5,014,046 | 5/1991 | Minami | 340/727 |
| 5,043,721 | 8/1991 | May | 340/825.44 |
| 5,202,817 | 4/1993 | Koenck et al. | 364/708 |

FOREIGN PATENT DOCUMENTS

| | | | |
|---|---|---|---|
| 56-74765 | 6/1981 | Japan | 340/727 |
| 58-86486 | 5/1983 | Japan | 340/727 |
| 62-286329 | 12/1987 | Japan | |

Primary Examiner—Donald J. Yusko
Assistant Examiner—Edward Merz
Attorney, Agent, or Firm—Kelly A. Gardner; John H. Moore

[57] ABSTRACT

A selective call receiver (10) includes a display (22) for presenting received information signals. The display (22) is pivotally attached to the selective call receiver's housing (24) so that the display [means] (22) may be pivoted outwardly from the housing to facilitate viewing the display [means].

15 Claims, 2 Drawing Sheets

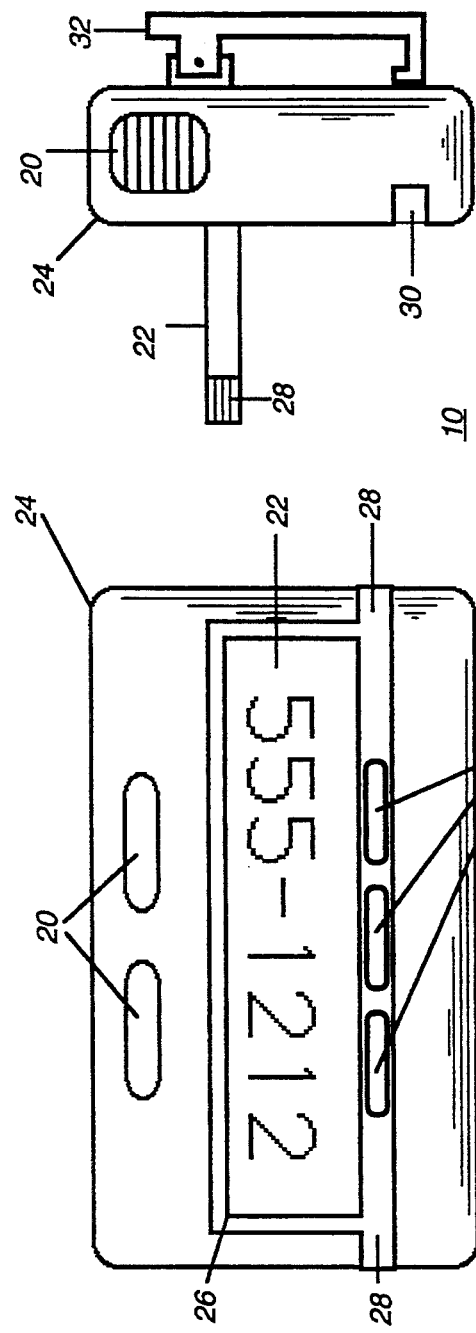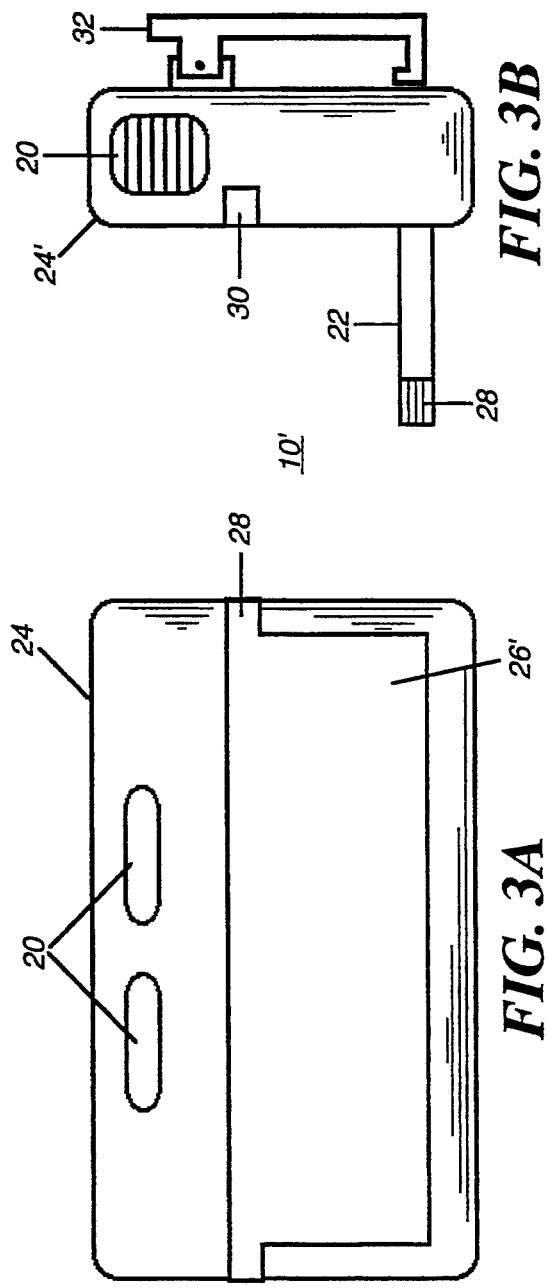

SELECTIVE CALL RECEIVER WITH FLIP-OUT DISPLAY

This is a continuation of application Ser. No. 07/583,622, filed Aug. 27, 1990, now abandoned.

FIELD OF THE INVENTION

This invention relates in general to selective call receivers, and more specifically toward those selective call receivers employing a display to present information, and is particularly directed toward a selective call receiver with a flip-out display.

BACKGROUND OF THE INVENTION

Many users of selective call receivers (e.g., pagers) prefer to carry (wear) the selective call receiver at their waist via an attachment device commonly referred to as a "Belt Clip". However, balanced against the convenience of the belt clip is the detriment of having to continually remove the selective call receiver from the waist whenever a message is received, and to replace the selective call receiver after a received message has been read. Accordingly, some designers of selective call receivers have opted to position a display on a top surface of the selective call receiver so that the display may be viewed without having to remove the selective call receiver (commonly referred to as a "Top Mount Display Pager") from the user's waist. Regrettably, due to the physical size of contemporary selective call receivers, a top mounted display is generally quite small, which may frustrate the viewing of any information or of a message presented on the display. Others have created elaborate selective call receiver carrying holsters that can be operated to permit viewing a larger display positioned on a front surface of the selective call receiver. Still others have compromised between the foregoing designs by positioning a display on a slanted or beveled portion of the selective call receiver so that the display can be viewed by tipping the selective call receiver away from the user's body.

Unfortunately, while others tried these various techniques to compensate for the detriment of waist-worn selective call receivers, the consumer remains faced with using extraneous carrying holsters or having to awkwardly adjust the selective call receiver to view the display. Accordingly, a need exists for a selective call receiver that fully exploits the advantages of a waist-worn selective call receiver while contemporaneously avoiding the detriments that plague the prior art.

SUMMARY OF THE INVENTION

A selective call receiver comprises a housing portion for accommodating receiving means for receiving an information signal. The housing portion comprises first and second surfaces opposite each other, the first surface having formed therein a recess. A display portion includes a display which is electrically coupled to the receiving means for displaying at least a portion of the information signal. The display portion has inner and outer surfaces opposite each other, wherein the display is visible from the outer surface. The display portion is pivotally attached to the housing portion such that the display portion rotates between an open position and a closed position. When in the closed position, the display portion is situated within the recess such that the outer surface of the display portion lies flush with the first surface of the housing portion and the display is visible to a user from a first viewing angle. When in the open position, the display portion extends from the housing portion such that the display is visible to the user from a second viewing angle.

BRIEF DESCRIPTION OF THE DRAWINGS

FIGS. 2a and 2b are illustrations of a selective call receiver in accordance with the preferred embodiment of the present invention.

FIGS. 3a and 3b are illustrations of a selective call receiver in accordance with an alternate embodiment of the present invention.

BRIEF DESCRIPTION OF THE DRAWINGS

Figure 1:
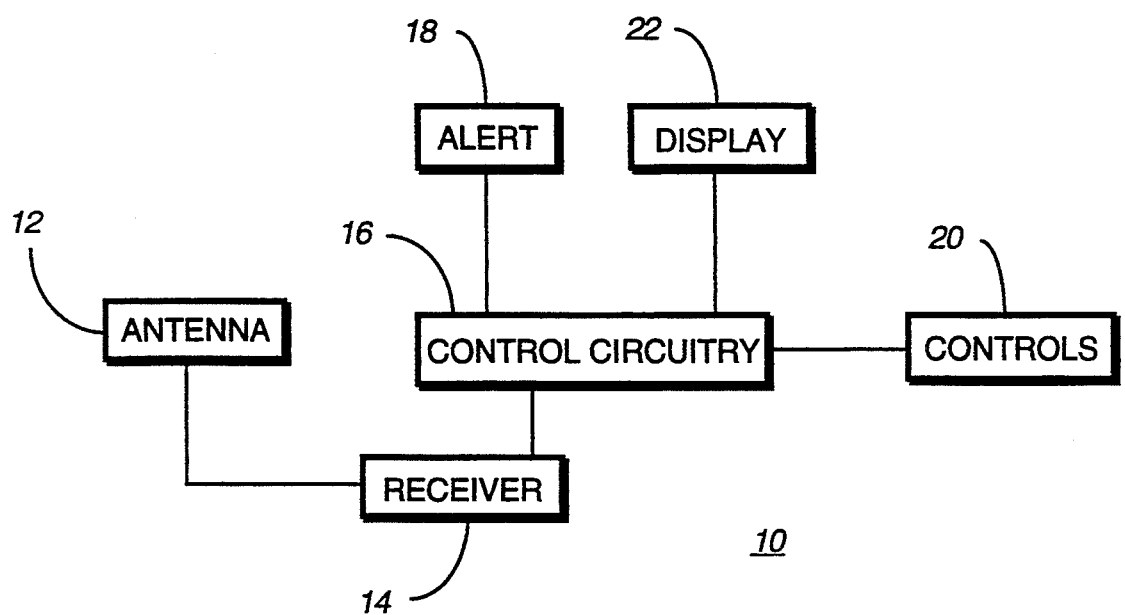
FIG. 1 is a block diagram of a selective call receiver that may advantageously employ the present invention.

Referring to FIG. 1, a selective call receiver 10 operates to receive information via an antenna 12 and a receiver 14. The selective call receiver 10 also includes control circuitry 16 that interfaces with the receiver 14 an alert 18 to alert the user of received information via a sensible alert, such as, for example, a visual alert, an audible alert, or a vibratory alert. The control circuitry 16 also at least partially controls a display means 22, which may be used to present received information either automatically or in response to the user controls 20.

According to the invention, the display 22 is preferably pivotally attached to a housing which accommodates at least a portion of the selective call receiver circuitry illustrated in FIG. 1. In this way, the preferred display may be adjusted from a closed position to an open position that will enable the display to be readily viewed while the selective call receiver is being carried (worn) at waist level.

Referring to FIGS. 2a and 2b, the selective call receiver 10 can be seen enclosed in the housing 24. In addition to accommodating all or a portion of the selective call receiver circuitry, the housing may also accomodate a power source (e.g., a battery, not shown) or other circuits or structures. As illustrated in FIGS. 2a and 2b, the preferred configuration of the present invention employs a front mounted display 22, which allows the present invention to use a larger, more visible and readable display. In the preferred embodiment, display 22 is mounted in a frame 26 that is constructed and arranged to be pivotally attached to the housing 24 and reside in a recess in the housing 24 so as to be substantially flush with an outer front surface of the housing when the display is in a closed position (see FIG. 2a). To adjust the display to an open position (FIG. 2b), the frame 26 preferably incorporates at least one shoulder 28 that extends to an outer side surface of the housing so as to facilitate adjusting the display 22. The shoulder(s) 28 also reside in recesses 30 so as to be substantially flush when the display is closed.

The preferred display means can be pivotally attached to the housing in any convenient conventional manner (e.g., hinges, pins, etc.). To view the display, a user may adjust (e.g., pivot, rotate, swing, etc.) the display means 22 by using the shoulders 28 to outwardly (and/or upwardly) move the display into an open position to facilitate viewing the display while the selective call receiver is being carried (worn) at waist level. Alternately, of course, the selective call receiver can be removed from waist level and viewed directly without having to adjust the display (see FIG. 2a).

Optionally, the selective call receiver of the present invention may include any known conventional latching or securing means (not shown) to secure the display in the closed and/or open position. As an example, and not as a limitation, a conventional magnetic latching arrangement may be used to secure the display in the closed position and an interference (i.e., friction) fit between the frame and housing may secure the display in the open position. By using a latching or securing arrangement, the user may operate "hands-free" to make notes or copy a message without having to occupy one hand holding the selective call receiver or a carrying holster.

The preferred selective call receiver 10 includes a belt clip (or equivalent) 32 so at to enable the user to carry (wear) the selective call receiver at waist level. Optionally; the belt clip 32 may be removable to reduce the physical size and profile of the selective call receiver 10.

Operationally, the user controls the selective call receiver 10 via controls 20, which may be mounted in a conventional arrangement on the housing 24. Optionally, the present invention contemplates that one or more controls 20 may be positioned on the frame 26 so as to be readily accessible to the user when the display is adjusted (pivoted) to its open position.

Referring to FIGS. 3a and 3b, an alternate embodiment of the present invention positions the display 22 in a frame 26' that is pivotally mounted to the housing 24' so as to be pivotally adjusted outwardly (and/or downwardly). This embodiment has an advantage in that the display 22 is shielded or protected in the closed position (see FIG. 3a) by the frame 26'. This display means can also be pivotally attached to the housing in any convenient conventional manner (e.g., hinges, pins, etc.). To view the display, a user may adjust (e.g., pivot, rotate, swing, etc.) the display 22 by using the shoulders 28 to outwardly (and/or downwardly) move the display 22 into an open position to facilitate viewing the display while the selective call receiver is being carried (worn) at waist level. However, in this embodiment, the selective call receiver 10' cannot be viewed directly without adjusting the display to its open position (see FIG. 3b).

As in the embodiment discussed in conjunction with FIGS. 2a and 2b, the preferred selective call receiver 10' includes an optionally removable belt clip (or equivalent) 32, so as to enable the user to carry (wear) the selective call receiver at waist level. Also, the controls 20 may be conventionally mounted as well as positioned on the frame 26'. Additionally, the selective call receiver 10' may optionally include any known conventional latching or securing means (not shown) to secure the display in the closed and/or open position. The example discussed above (i.e., a conventional magnetic latching arrangement used to secure the display in the closed position and an interference (i.e., friction) fit between the frame and housing to secure the display in the open position) may be particularly useful in the embodiment of FIGS. 3a and 3b.

In summary, the present invention advantageously employs a pivoting display means to facilitate viewing the display while the selective call receiver is carried (worn) at waist level. This provides consumers of selective call receivers a convenient way to both carry the selective call receiver and view received messages or other information.

What is claimed is:

1. A selective call receiver, comprising:

a housing portion for accommodating receiving means for receiving an information signal, the housing portion comprising first and second surfaces opposite each other, the first surface having formed therein a recess;

a display portion comprising a display which is electrically coupled to the receiving means for displaying at least a portion of the information signal, the display portion having inner and outer surfaces opposite each other, wherein the display is visible from the outer surface;

wherein the display portion is pivotally attached to the housing portion such that the display portion rotates between an open position and a closed position;

wherein, when in the closed position, the display portion is situated within the recess such that the outer surface of the display portion lies flush with the first surface of the housing portion and the display is visible to a user from a first viewing angle; and wherein, when in the open position, the display portion extends from the housing portion such that the display is visible to the user from a second viewing angle.

2. The selective call receiver according to claim 1, further comprising:

at least one user control disposed on the outer surface of the display portion such that the at least one user control is accessible to the user when the display portion is in either the open or closed positions.

3. The selective call receiver according to claim 1, further comprising securing means for securing the display portion in the open position.

4. The selective call receiver according to claim 1, further comprising securing means for securing the display portion in the closed position.

5. The selective call receiver according to claim 1, further comprising one or more protrusions integrally formed at edges of the display portion for facilitating adjustment of the display portion between the open and closed positions.

6. The selective call receiver according to claim 1, further comprising a belt clip coupled to the second surface of the housing portion for attaching the selective call receiver to an external article.

7. The selective call receiver according to claim 6, wherein, when in the open position, the display portion extends perpendicularly from the housing portion such that the display is more easily viewed by the user when the selective call receiver is attached to the external article.

8. A selective call receiver, comprising:

a housing portion for accommodating receiving means for receiving an information signal, the housing portion comprising first and second surfaces opposite each other, the first surface having formed therein a recess;

a display portion comprising a display which is electrically coupled to the receiving means for displaying at least a portion of the information signal and controls for controlling selected receiver operations, the display portion having inner and outer surfaces opposite each other, wherein the display is visible from the inner surface and the controls are accessible from the inner surface;

wherein the display portion is pivotally attached to the housing portion such that the display portion rotates between an open position and a closed position;

wherein, when in the closed position, the display portion is situated within the recess such that the outer surface of the display portion lies flush with the first surface of the housing portion and the inner surface, including the display and the controls, is hidden from view; and wherein, when in the open position, the display portion extends from the housing portion such that the display on the inner surface is visible and the controls on the inner surface are accessible.

9. The selective call receiver according to claim 8, further comprising securing means for securing the display portion in the open position.

10. The selective call receiver according to claim 8, further comprising securing means for securing the display portion in the closed position.

11. The selective call receiver according to claim 8, further comprising one or more protrusions integrally formed at edges of the display portion for facilitating adjustment of the display portion between the open and closed positions.

12. The selective call receiver according to claim 8, further comprising a belt clip coupled to the second surface of the housing portion for attaching the selective call receiver to an external article.

13. The selective call receiver according to claim 12, wherein when in the open position, the display portion extends perpendicularly from the housing portion such that the display is easily viewed by a user and the controls are easily accessible to the user when the selective call receiver is attached to the external article by the belt clip.

14. A selective call receiver, comprising:

a housing portion having front and back surfaces opposite each other, and having top and bottom surfaces opposite each other, wherein the top surface is coupled between the front and back surfaces at an upper end of the housing portion, and the bottom surface is coupled between the front and back surfaces at a lower end of the housing portion, and wherein the front surface has formed therein a recess;

a display portion pivotally attached to the front surface of the housing portion at the upper end, the display portion comprising a display for displaying information and controls for controlling selected operations of the selective call receiver, wherein the display portion and controls are located on an outer surface of the display portion, and wherein the display portion further comprises at least one protrusion integrally formed therefrom for facilitating the rotation of the display portion with respect to the housing portion;

a belt clip coupled to the back surface of the housing portion for attaching the selective call receiver to an external article such that a user can carry the selective call receiver;

wherein the display portion can be upwardly rotated, towards the upper end of the housing portion, into a closed position in which the display portion, including the at least one protrusion, is situated within the recess such that the outer surface of the display portion lies flush with the front surface of the housing portion and the display and controls and visible and lie in a plane parallel to the front surface; and wherein the display portion can be downwardly rotated, towards the lower end of the housing portion, into an open position in which the display portion is substantially parallel to the bottom surface of the housing and in which the display is more easily viewed and the controls are more easily manipulated by a user carrying the selective call receiver.

15. A selective call receiver, comprising:

a housing portion having front and back surfaces opposite each other, and having top and bottom surfaces opposite each other, wherein the top surface is coupled between the front and back surfaces at an upper end of the housing portion, and the bottom surface is coupled between the front and back surfaces at a lower end of the housing portion, and wherein the front surface has formed therein a recess;

a display portion pivotally attached to the front surface of the housing portion at the lower end, the display portion comprising a display for displaying information and controls for controlling selected operations of the selective call receiver, the display portion further comprising an inner surface on which the display and controls are located and an outer surface, wherein the display portion further comprises at least one protrusion integrally formed therefrom for facilitating the rotation of the display portion with respect to the housing portion;

a belt clip coupled to the back surface of the housing portion for attaching the selective call receiver to an external article such that a user can carry the selective call receiver;

wherein the display portion can be upwardly rotated, towards the upper end of the housing portion, into a closed position in which the display portion, including the at least one protrusion, is situated within the recess such that the display and controls are hidden and the outer surface of the display portion lies flush with the front surface of the housing portion; and wherein the display portion can be downwardly rotated, towards the lower end of the housing portion, into an open position in which the display portion is substantially parallel to the bottom surface of the housing and in which the display is easily viewed and the controls are easily manipulated by a user carrying the selective call receiver.

* * * * *

UNITED STATES PATENT AND TRADEMARK OFFICE
CERTIFICATE OF CORRECTION

PATENT NO. : 5,398,023
DATED : March 14, 1995
INVENTOR(S) : Bradley A. Murray

It is certified that error appears in the above-indentified patent and that said Letters Patent is hereby corrected as shown below:

Column 6, line 4, delete "upper" and insert --lower--.

Column 6, line 10, before visible delete "and" and insert --are--.

Column 6, line 12, delete "downwardly" and insert --upwardly--.

Column 6, line 13, delete "lower" and insert --upper--.

Column 6, line 15, delete "bottom" and insert --top--.

Signed and Sealed this

Twenty-sixth Day of December, 1995

Attest:

BRUCE LEHMAN

*Attesting Officer*  *Commissioner of Patents and Trademarks*